INVENTORS.
M. N. ROSS, A. J. STREB, C. N. YOUNG
BY
ATTORNEY.

INVENTORS.
M.N. ROSS, A.J. STREB, C.N. YOUNG
BY
ATTORNEY.

INVENTORS.
M.N. ROSS, A.J. STREB, C.N. YOUNG
BY
*Gerald L. Smith*
ATTORNEY.

INVENTORS.
M. N. ROSS, A. J. STREB, C. N. YOUNG
BY
ATTORNEY.

United States Patent Office 3,423,249
Patented Jan. 21, 1969

3,423,249
BURNER UNIT AND THERMOELECTRIC
GENERATOR INCORPORATING SAME
Milford N. Ross, Lutherville, and Alan J. Streb and Charles N. Young, Baltimore, Md., assignors to Martin-Marietta Corporation, New York, N.Y., a corporation of Maryland
Filed June 9, 1965, Ser. No. 462,512
U.S. Cl. 136—212
Int. Cl. H01v 1/32; F23d 3/40
19 Claims This invention relates to thermoelectric generators and more particularly to hydrocarbon-fueled thermoelectric generators having improved characteristics of performance and higher efficiencies.

The generation of consistent and reliable electrical power through the use of thermoelectric systems has shown promise to provide for superior performance in numerous power supply applications. When compared with conventional generators, the advantages deriving from the use of thermoelectric generators become readily apparent in the field of portable power supply where light weight and simplicity of operation are afforded prime emphasis. Where employed to provide portable power, conventional engine-driven generators are relatively heavy, must utilize a multitude of moving parts and often require undesirable expenditures of time for maintenance and personal attendance during operation. Battery-derived electrical power devices suffer the disadvantages of limited battery lifetimes and restricted operability under extremes of weather or operating environment in addition to the burden of having an inherently heavy weight.

The concept of thermoelectric power generation suggests the availability of a simple system having no moving parts, ease of maintenance; silent, vibration-free operation, relatively lightweight construction, portability deriving from inherently low bulk and operability under extremes of weather conditions. Further, the systems would appear to require only minimal personal attention where operation is required in remote locales.

To the present time, however, several obstacles have inhibited the development of reliable and sufficiently powerful portable thermoelectric generators. Improved thermal materials in the form of semiconductors having high thermoelectric resistivity and thermal conductivity have been developed; however, their application to practical and economical generator use has been somewhat hindered due principally to the nature of their physical structure and operational requirements. Thermoelectric materials are fragile, require specialized operating environments and operate at proper efficiencies only within consistent and carefully defined heat input ranges. Additionally, the thermoelements require a particularized and well-controlled heat distribution across their lengths in order to operate within desirably efficient design parameters.

Numerous thermoelectric generator designs have been advanced showing attempts to unite suitable mechanical support, operating environment and heat input to properly retain a thermopile or array of thermoelectric elements within a generator unit; however, the designs have met with only marginal success. Generators heretofore constructed for the most part utilize liquid fuel burners providing vertical heating geometry wherein thermoelectric elements are arranged about a heated flue or heat distribution tubes which serve to convey thermal energy to the hot sides of the elements. This conventional arrangement suffers the limitations of affording generator operability only when aligned in a substantially vertical position and of developing an inherently uneven heat distribution along the length of the vertical flue or heat tubes. The existence of a varying heat input necessitates operation of portions of the array of thermoelectric elements at temperatures above or below optimum levels, thereby resulting in undesirable efficiency losses. Under condition of general use where generator alignment with vertical reference varies considerably, resultant heat input variation will additionally cause accelerated degradation or total physical breakdown of the elements themselves. A nonuniform heat input to individual elements also results in an irregular electrical output from the generator, thereby necessitating the introduction of undesirably complex output responsive power control arrangements. Insufficient heat input control has also resulted in undesirably complex heat removal schemes or compensating heat sink configurations in connection with the "cold sides" of the thermoelements. In many instances, it has been found necessary to provide separately-powered flowing fluid heat exchange systems to establish requisite heat distribution across individual elements. Such additions to the units deviate from a desired overall generator design simplicity, consequently affecting operational reliability and increasing the weight and bulk of the devices.

Conventional liquid fuel delivery systems also contribute to deviations in overall heat input to generator thermopile units in that heating unit fuel burning rate varies proportionately with fuel delivery pressures. As the fuel storage level of a conventional tank diminishes, corresponding tank pressures diminish proportionately. As a consequence of the resulting irregular heat input, generator output will vary, unless extraneous control devices are introduced, requiring the personal attention of an operator. Generally, fuel tank pressures are established inefficiently high at start-up in order to develop lengthened operational periods for the generators. As a result, heat input is inefficiently high at start-up and undesirably low at the termination of generator operation.

The fragile, brittle nature of individual thermoelectric elements has also required the use of intricate supporting devices adapted to compensate for the expansion-induced pressures attendant with varying heat loads. A positive control of heat input will allow for less elaborate and more reliable supporting mechanism designs. Of course, simplified designs will lead to more facile and economical generator thermopile fabrication.

The foregoing design requirements induced by the interrelated problems of heat input control and a physical delicacy inherent in thermoelements have necessarily evoked undesirable complexities in generator structures. Consequently, the development of a relatively simple and efficient generator of modular concept has been somewhat restricted.

To enhance operational flexibility, portable generators should be operable with a broad range of gasoline fuels. Unfortunately, however, the burner units of conventional devices are susceptible to fouling or clogging after short operating periods, especially where fuels having lead additives are burned. It has become necessary, therefore, to establish separate storage facilities for specialized fuels when extended field use of a generator is contemplated.

The invention as now presented offers solution to the deficiencies outlined above and others by providing a thermoelectric generator of advantageous modular design having a controlled and considerably more efficient distribution of heat to its thermoelectric elements.

The generator is particularly characterized in utilizing a unique fuel burning system adapted to develop a controlled heat or flame pattern thereby allowing an efficient, maximum utilization of radiation effects and heat of combustion within the unit.

By virtue of the incorporation therein of a combustion chamber having a combustion screen, a controlled, uniform heat deployment is provided about the generator thermopile array, thereby allowing the optimum functioning of each individual thermoelement within the thermopile.

The production of heat at the combustion screen of the novel burner unit permits the efficient deployment of a plane of combustion at a position juxtaposed to the heat input sides of all thermoelements, thereby eliminating or minimizing a requirement for convective heat transfer devices between flame and thermopile.

Additionally, the deployment of the plane or surface of combustion conveniently near the heat-absorbing thermopile face permits an efficient radiation transfer from combustion to thermoelements arrayed within the thermopile.

Another object of the invention is to provide a controlled fuel-air distribution about the combustion screen of a generator burner unit through uniform pressure distribution of fuel over the screen.

It is another object of the invention to provide a thermoelectric generator having a combustion chamber capable of developing substantially uniform temperatures across the face of a combustion screen.

The invention further provides a thermoelectric generator having improved heat input control to a thermopile, and a correspondingly improved heat sink disposition so as to derive an accurate and improved distribution of heat across thermoelements arrayed within the thermopile.

A further object is to provide a thermoelectric generator which is operable in a variety of positions.

As another object, the invention provides for uniformly pressureized fuel delivery to the generator combustion chamber during its entire period of operation, thereby insuring uniform power output and efficient fuel utilization.

An additional object is to provide a generator having minimized thermoelement degradation and consequently a long thermoplie operating life.

Another object of the invention is to provide a generator burner unit having an improved operating life while using leaded gasoline fuels.

A further object is to provide a thermoelectric generator of improved fabricability, capable of use with conventional gasoline, propane or natural gas.

As an additional object, the invention presents a generator which is fast-starting, operable within a wide range of positions and ambient environs and which is resistant to mechanical shock.

Another object of the invention is to proivde a portable, electric power supply of light weight and having a uniquely and efficiently cooperating fuel delivery system, fuel combustion system, thermopile unit and heat sink arrangement.

These and other objects of the invention are further described and illustrated by the following discussion and related drawings in which:

FIGURE 1 is a perspective view of a small thermoelectric generator incorporating the novel features of the instant invention;

FIGURES 2a to 2e provide an exploded view illustrating individual, interrelated components of the inventive thermoelectric generator;

Figure 1:
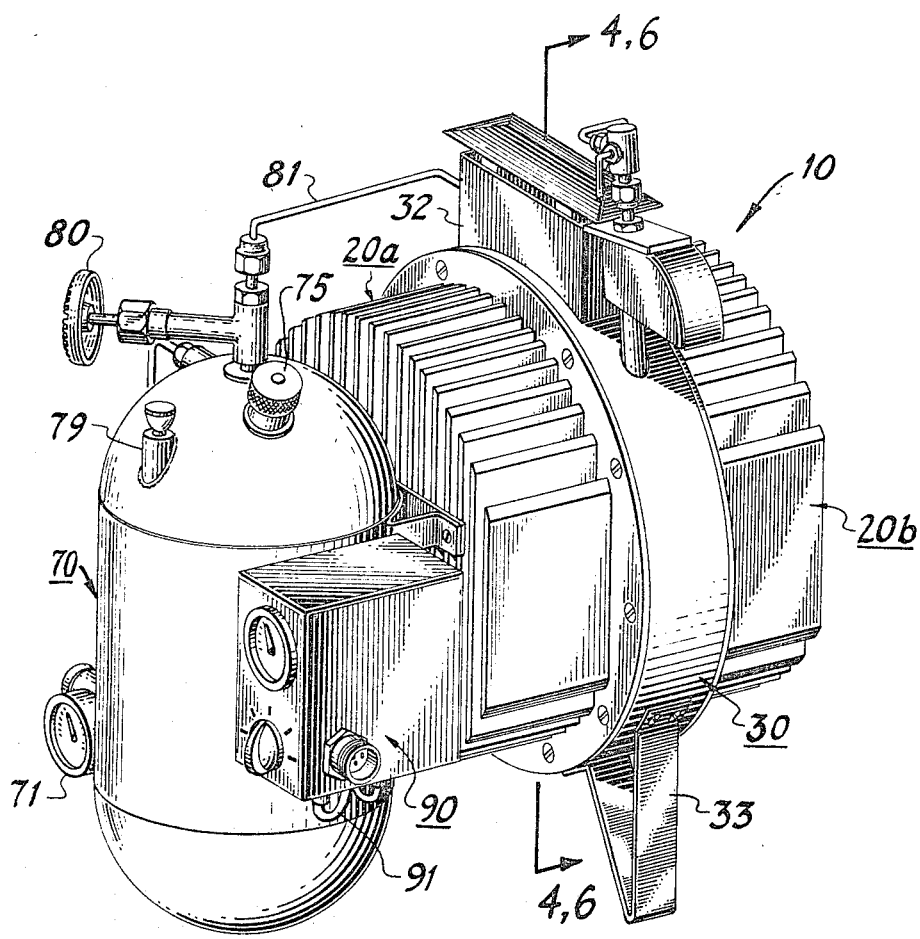

Referring to FIGURE 1, a gasoline-fired thermoelectric generator 10 is generally depicted which utilizes two modular thermopile units 20a and 20b, having finned radiative heat sinks protruding outwardly. To facilitate the description of the instant thermoelectric generator, matching or "mirror-image" components positioned on opposing sides of the generator are identified by the same numeral plus the subscript "a" or "b," the latter serving to define which particular component is being described. The thermopile units are removably attached to a single, centrally situated cylindrical burner unit 30 having an outer housing 31 through which projects a covered stack or flue 32 and generator supporting legs 33. To the outward surface of the thermopile 20a radiator there is connected a pressurized fuel tank assembly 70. On the upper portion of tank assembly 70, fuel delivery valving and delivery lines are shown joining the tank with burner unit 30. To one side of tank 70 there is connected a tank pressure gauge 71 and upon the opposite side is attached a container 90 enclosing power output circuitry along with performance monitoring devices. Lead cables 91 interconnect thermopile generating units 20a and 20b with the circuitry of container 90.

As will be evident from the drawing and detailed discussion to follow, the generator design enjoys, inter alia, the advantages of compactness, modular structure allowing an improved and efficient system integration, portability and minimized weight. The individual components of the assembly are functionally united so as to be easily accessible and replaceable during field operation using only a minimum of basic hand tools.

The above-suggested conveniences will become more apparent when considered in connection with FIGURES 2a to 2e wherein the invidiual components of the generator are shown in exploded and aligned fashion in order to afford insight into its general operational aspects.

Figure 2A:
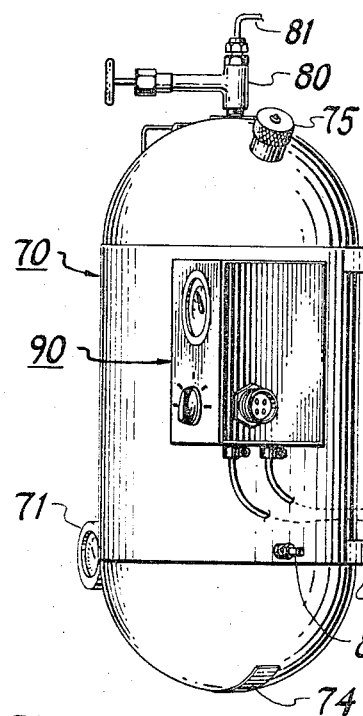
Figure 2B:
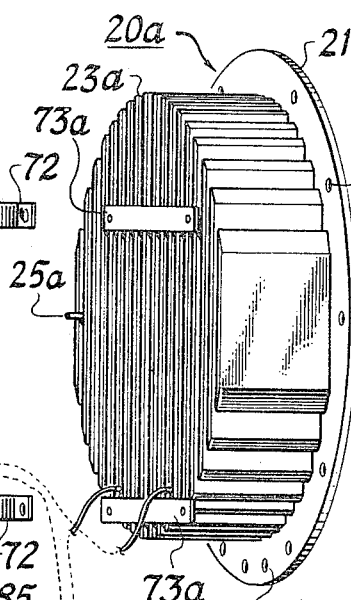

Referring to FIGURE 2a, the centrally situated and relatively thin, disk-shaped burner unit 30 comprises two circular burner screens, one of which is shown at 34a. The screens define parallel heat generating surfaces at the opposed lateral faces of the unit, and are supported about their peripheries by outward extending rings 42a and 42b. Additionally located intermediate the screens and disposed about their circumferences is a fuel delivery manifold 36 having an inner duct for feeding a fuel-air mixture to a combustion chamber defined between the screens and manifold. Carburetion of fuel and air for the metered feeding of the combustible fuel mixture to manifold 36 is provided by a carburetor represented generally at 50. Upon the upward side or apex of the burner unit, exhaust stack or flue 32 is connected surounding manifold 36 to openings within rings 42a and 42b. Stack 32 provides for the removal of combusted gases from the outward sides of burner screens 34a and 34b. A protective cover 39 (FIG. 4) is adjustably connected to the stack at its outward opening. An access conduit or tap 37 having a threadably connected cap 38 is positioned at the bottom of manifold 36 for removing fluid products of combustion and the like which may accummulate within the manifold. The above-described burner unit 30, including burner screens, stack, manifold and additionally, the carburetor assembly 50 are adapted for positioning within a ring-shaped annular housing 31 shown at FIGURE 2b. Housing 31 is fabricated having openings of size suitable to receive stack 32 and conduits from carburetor assembly 50. The housing ring serves to support the generator structure, and to secure thermopile units 20a and 20b against the faces of burner unit 30. A plurality of U-shaped clips 40 are spaced about the inner surface of the housing for the purpose of providing a simple bolted or sheet metal screw connection attaching the aforesaid thermopile units in appropriate position. Generator supporting legs 33 are spotwelded to the assembly as shown.

Figure 2C:
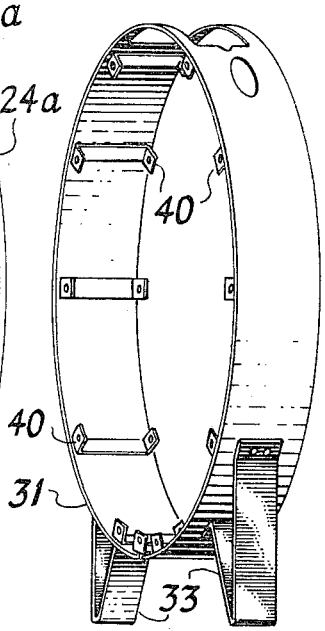

In FIGURE 2c a thermopile unit 20b is represented as having a circular base plate 21b upon the inward face of which is attached a thin, flexible, dish-shaped disk 22b, the concavity of which encloses an array of thermoelectric elements. Upon the opposing, outward face of base plate 21a and normal thereto there is connected a heat-radiating assembly comprising a plurality of spaced, parallel fins 23b. Located about the perimeter of the base plate are a number of spaced holes 24b adapted to receive bolts for interconnection with the correspondingly spaced clips 40 of the housing ring shown in FIGURE 2b. Leads 91b are provided to electrically interconnect the thermopile unit with output circuitry located within container 90.

Figure 2D:
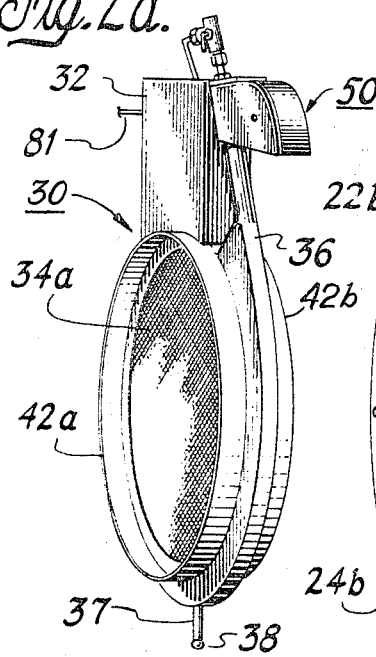

A similar thermopile unit 20a as shown in FIGURE 2d is supported against the opposite side of the burner unit 30 by connecting base plate 21a of the thermopile unit to the clips 40 of housing 31. The same manner of attachment is utilized as is used in connecting thermopile unit 20b to the housing. Extending through the base plate 21a of the thermopile unit is a relatively small conduit or pipe 25a which is used during fabrication for injecting an inert gas into the encapsulated array of thermoelements disposed within the thermopile.

Figure 2E:
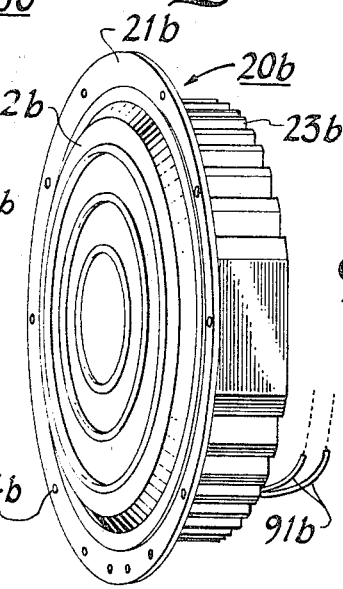
Figure 5:
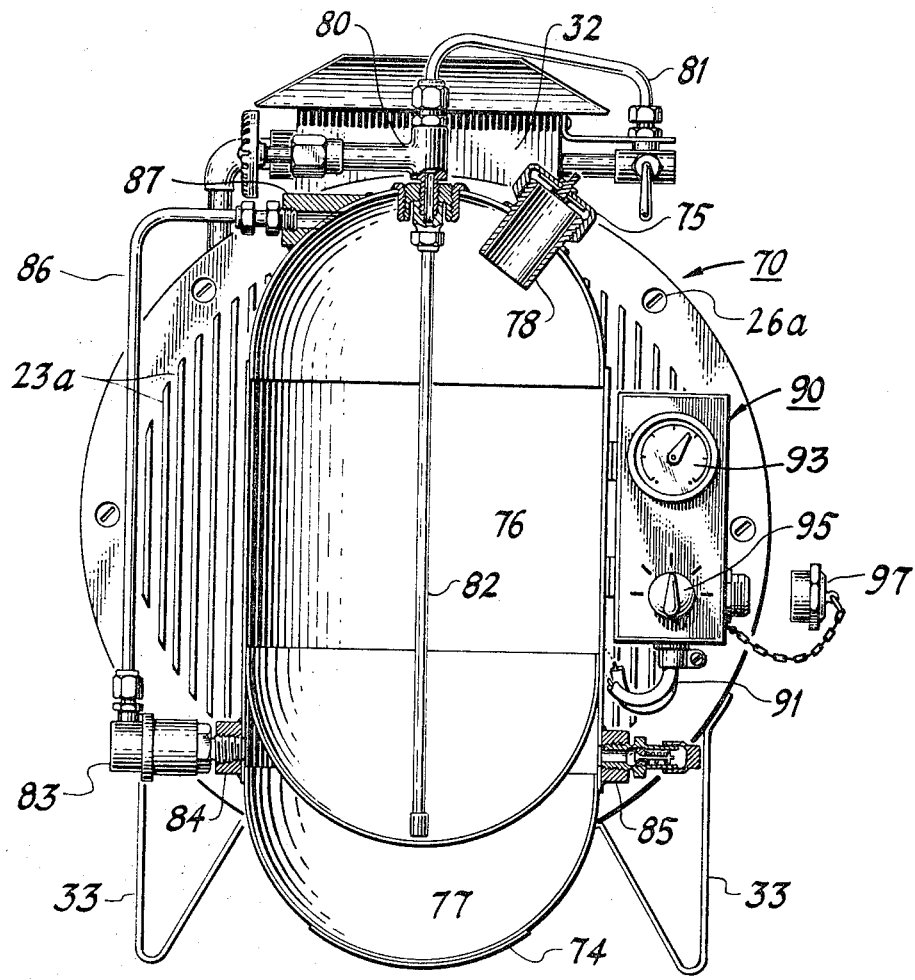
FIGURE 5 is a side elevational view of an exemplary thermoelectric generator revealing a fuel tank and distribution unit with portions of the arrangement removed.

A pressurized fuel tank assembly 70 is illustrated in FIGURE 2e. The assembly, as is described in detail in connection with FIGURE 5, is adapted for supporting connection to the outward edge of radiator fins 23a of thermopile unit 20a. Connection is made by bolting brackets 72 to bands 73a attached to the outward edges of fins 23a with machine screws or the like. A bumper strip 74 is shown connected to the lowermost portion of the tank assembly to form the third supporting point of a three-legged support with legs 33 for the generator. Additionally illustrated in the figure are a fuel tank filler port and cap 75, primary fuel delivery valve 80 and circuitry container box 90. A fuel line 81 is partially shown in broken fashion in the figure. When assembly of the generator is completed, fuel line 81 interconnects the tank assembly 70 with carburetor assembly 50.

As will be apparent to those skilled in the art, the modular design evidenced by the individual assemblies or modular components shown in FIGURES 2a to 2e, lends itself to considerably simplified and economical manufacturing techniques. Producibility is enhanced by the use of identical thermopile-radiator units and simplified mounting procedures resulting from minimized tolerance requirements at component interconnections. Complimenting the improved fabricability, the generator is readily repairable in the field by the easily accomplished exchange of any of the modular components. For instance, the fuel tank assembly is removed by disconnecting fuel line 81 with an open-end wrench and removing four mounting screws or bolts from brackets 72. The interchangeable thermopile modules 20a and 20b are disconnected by removing about twelve mounting screws as at 24a or 24b. It follows that removal of the thermopile modules allows for the replacement of burner unit 30.

Figure 3:
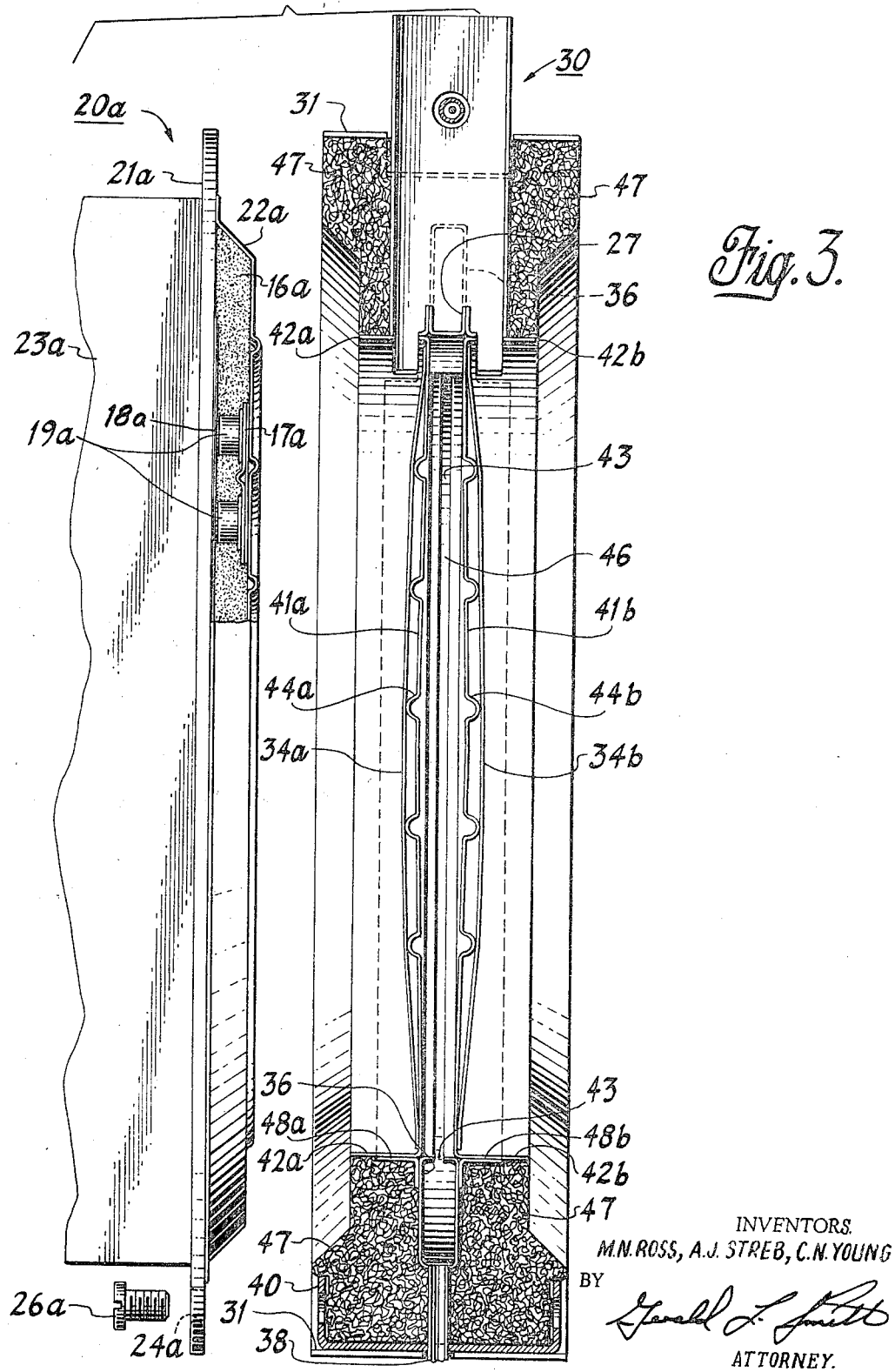
FIGURE 3 is a side elevational view showing in partially-exploded and cut-away fashion an exemplary thermopile and burner chamber construction for the inventive thermoelectric generator.

Turning to the burner unit 30 design in more detail, it will be evident that the above-discussed, horizontally-oriented modular structure is made available by virtue of the burner dual surface planar heating mode. Referring to FIGURE 3, the internal structure of the burner unit 30 and a mated thermopile unit 20a is revealed. At the center of the burner unit, manifold 36 is positioned to deliver a fuel-air mixture from carburetion into a chamber 46 defined between the circular baffle or pressure plates 41a, 41b and the manifold. The fuel-air mixture enters about the periphery of the chamber 46 through a continuous opening or slit 43 situate centrally along the inner circumferential surface of the manifold. The pressure plates 41a and 41b, preferably formed from stainless steel, are perforated with regularly spaced holes and uniquely function to aid in establishing a uniform flame pattern across the opposed faces of the burner. The pressure plates are fabricated having a slightly convex configuration so as to assure that thermal expansion of the plates will not diminish the volume of the chamber 46 established between their surfaces. As may be evidenced from the drawing, the spacing rings 42a and 42b are formed integrally with the pressure plates. In addition to providing simplified support for the pressure plates, the aforesaid rings serve also to establish proper spacing or burner depth between the pressure plate surfaces 41a and 41b and the respective thermopile hot ends at 22a and 22b. It has been determined that a burner depth of about ½ inch results in an optimization of heat transfer from burner to thermopile. Also formed integrally with the pressure plates are bolsters 44a and 44b shown spaced in parallel fashion across the pressure plate surfaces and protruding outwardly therefrom. The bolsters may be formed integrally with the pressure plates in the interest of simplification of manufacture. A small channel-shaped bracket 27 is positioned at the upper periphery of chamber 46 for the purpose of blocking fuel mix from the stack 32.

Over the outward face of each pressure plate are burner screens 34a and 34b about which are developed planes of combustion of the fuel-air mixture issuing from perforations 35a and 35b. The screens, which are preferably fabricated from 200 mesh Inconel X wire screen, are readily attached to the pressure plates by spotwelding along their outer peripheries. Bolsters 44a and 44b support the screens away from the surfaces of the pressure plates for the purpose of establishing relatively even fuel distribution to a suitably free combusting surface.

Figure 4:
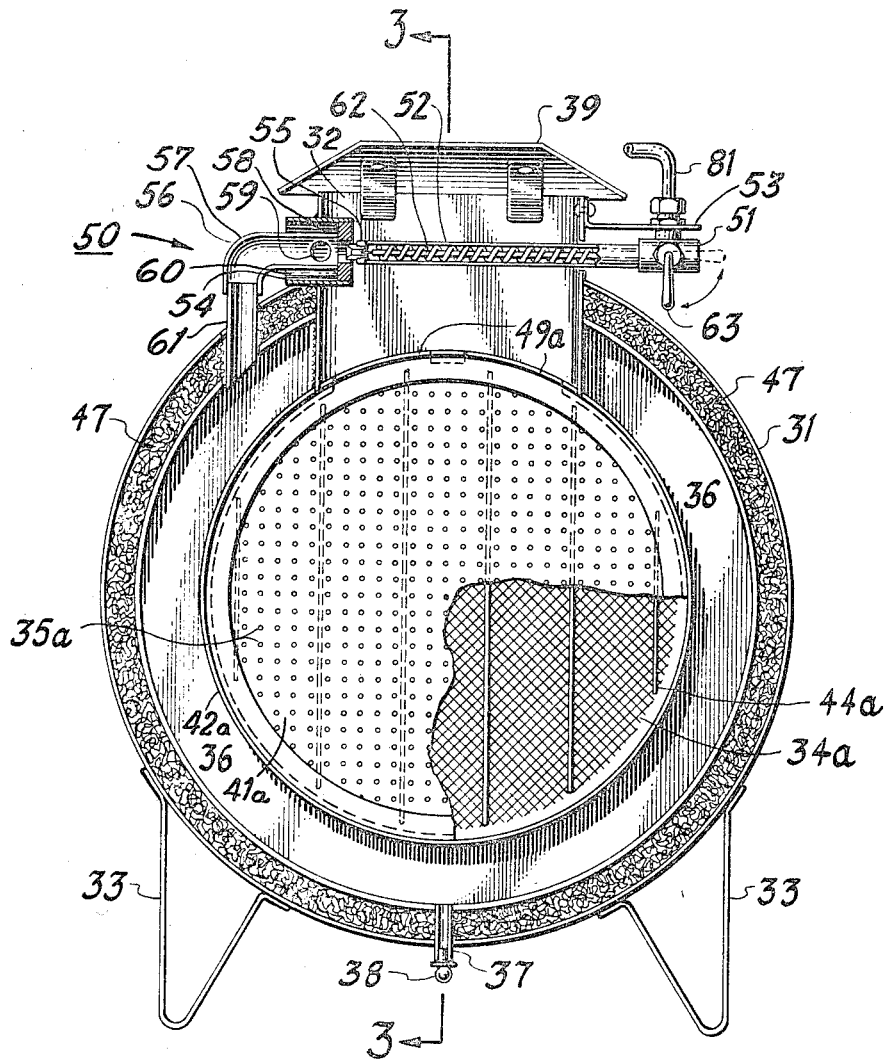
FIGURE 4 is a front elevational view of an alternate embodiment of an exemplary combustion chamber partially cut away.

Looking to FIGURE 4, the above-discussed sectioned portrayal of the preferred burner unit is supplemented by observation of the unit from a longitudinal-axial position. In the drawing, the fuel delivery manifold is revealed in section as having a uniform cross section along its curvature. The manifold teminates at its junctions with stack 32. An insulating material placed about the burner at 47 provides both a modicum of support and an insulative effect between the manifold and outer housing 31. Conventional insulative materials will be found suitable for the instant use. Support for the pressure plate, burner screen and ring 42 assembly is provided by the manifold 36 in combination with angular ring members 48a and 48b.

Openings or spaces 49a and 49b are provided in rings 42a and 42b beneath stack 32, opening 49b and ring 42b not appearing in FIG. 4 since they are located on the opposite side of the apparatus, to permit exhaust gas flow from the combustion screens through the stack.

Additionally illustrated in the drawing is the more preferred carburetion assembly 50 for use with the above-described manifold and burner surface arrangement. Conventional gasoline or other suitable fuel is provided under pressure at line 81 from the fuel tankage 70. The fuel is introduced into a conventional clean-out plug cam assembly 51 and thence through a preheating conduit 52 where exhaust gases issuing through stack 32 from the outward surfaces of the burner screens 34a and 34b serve to preheat and vaporize the fuel, thereby facilitating the development of an appropriate fuel-air mixture. Assembly 51 is shown supported by a clip 53 attached to stack 32. Where conventional gasoline fuels are utilized, it has been found that a simple, minimal length of tubing is adequate to preheat gasoline to its boiling point.

Conduit 52 terminates at a supporting collar 54, its internal diameter being stepped down at its terminus in order to impart a desired higher velocity of fuel movement at carburetion. Stepping down in the present design is accomplished by threadably inserting a preformed nozzle 55 within the tip of conduit 52. Inserted within the open end of collar 54 is an elbow member 56, the horizontal leg 57 of which is attached, by welding or the like, to the inner face 58 of the collar. Apertures as at 59 are located about the leg 57 in the vicinity of the nozzle 55 outlet to provide air input and thereby establish a carburetion chamber at the nozzle outlet. Air entry or access to the holes or ports 59 is provided through the interspace 60 located between the leg 57 and collar 54. Following carburetion, the fuel-air mixture is directed from the vertical leg of elbow member 56, through a relatively short input pipe 61 having a somewhat enlarged diameter and thence into the burner chamber manifold 36.

For the purposes of minimizing coking or the build-up of undesirable by-products which may derive from fuel preheating, a clean-out pin 62 is incorporated within preheating conduit 52. The pin 62, extending along the length of conduit 52, is pivotally connected to a conventional cam assembly depicted only generally at 51. Horizontal reciprocatory movement causing the pin to clean the orifice within nozzle 55 is imparted to the pin by actuating the interconnected lever 63. A design commonly used for such devices is described in United States Patent No. 1,958,400 issued May 8, 1934.

Summarizing the burner operation, pressurized fuel enters the burner arena from fuel line 81 to be ejected at relatively high velocity through the constricted orifice of nozzle 55. The liquid fuel is substantially vaporized along preheating line 52. At the nozzle 55, final vaporization and mixing with air entering inlet ports 59 is effected by virtue of a sudden pressure drop and high entering velocity. The fuel-air mixture then exits from input pipe 61 into the manifold 36 to be distributed to the burner chamber 46 through the continuous opening 43 in the manifold. From within the burner chamber 46 the fuel-air mixture, its temperature having been raised during the above-described movements, issues through the openings 35a and 35b in the respective baffle plates 41a and 41b. Combustion of the fuel-air mixture occurs on the burner screens 34a and 34b. The combustion process which develops at the screens is a surface phenomenon having no dependence upon a catalytic activity of the screen material with the exception of temperature considerations. Burning is observed to be essentially without flame excursions and temperatures developed across the surfaces of the screens are uniquely uniform. The latter uniformity is most essential in providing for the efficient operation of a thermopile or array of thermoelements. Failure to assure requisite uniformity of heat input results in unacceptably inefficient power generation and often in an accelerated degradation of thermoelements.

A further operational advantage deriving from the controlled heat surfaces of the burner resides in the availability of a broadened environmental temperature operating range. Inasmuch as a predetermined temperature differential must be established along the length of each thermoelement, a high ambient temperature will allow only minimal tolerance of input temperature at the burner so as to avoid the destruction of thermoelements due to overheating. Additionally, the effective combustion regulation of the invention provides for corresponding accurate control over and prediction of fuel consumption, thusly permitting minimization of fuel tank size and filled weight.

When conventional gasoline fuels are utilized in combination with burner screen diameters of about 7 inches, acceptable screen combustion surface temperature uniformity is obtained where baffle plate holes or perforations 35a and 35b have a diameter of about 0.020 to 0.060 inch, a diameter of 0.035 inch being preferred. A regular, spaced pattern of the openings of about 0.25 inch between centers has been found adequate. It is important in all embodiments to afford a uniform deployment of fuel-air pressure drop across the perforations in order to assure a correspondingly uniform burner screen surface temperature. The holes in the pressure plates or baffle may be positioned to establish a burning pattern corresponding to the thermoelectric array design. Additionally, by varying spacing or hole size from top to bottom or from the center of the arrangement, a correction for temperature differences may be accomplished. A minor temperature differential resulting from the passage of hot exhaust gases from the bottom of the burner surface over the surface top portion to the flue may be readily corrected by utilizing smaller hole sizes at the top of the pressure plate.

Returning to FIGURE 3, a thermopile unit or module adopted for use with the instant burner arrangement is depicted at 20a. As may be evidenced from the drawing, both burner unit 30 and the thermopile modules as at 20a are of mating configuration such that the encapsulated array of thermoelements readily nests within the burner housing at appropriate burner depth against ring member 42a. Attachment is conveniently made by mounting base plate 21a to clips 40 using sheet metal screws such as 26a. The thermopile unit illustrated comprises basically an array of thermoelements at 19a mounted at their cold junctions to a circuit-completing surface 18a and coupled at their "hot ends" by a metallic shoe arrangement 17a. Surrounding the array of thusly formed thermocouples is a thermally and electrically insulative material 16a. The assembled and mounted array of thermoelements is encapsulated between base plate 21a and a thin, flexible metal diaphragm or disk 22a. A thin electrically-insulating disk formed of mica is positioned intermediate the thermoelements 19a hot end and disk 22a to provide appropriate electrical insulation. An inert atmosphere such as argon is retained under partial pressure within the encapsulated assembly to enhance thermoelectric performance and to induce a desirable compressive action against the thermoelements through atmospheric pressure upon the flexible disk 22a. A zirconium "getter" disk may be inserted within the encapsulated thermopile assembly for the purpose of absorbing oxide impurities tending to contaminate the inert atmosphere. The above thermopile assembly is described in detail in a co-pending application for patent entitled "Thermopile Assembly," Ser. No. 456,078, filed May 17, 1965, by A. J. Streb and John L. Kane.

Upon the outward face of base plate 21a there are attached a plurality of spaced, parallel radiating fins 23a serving, in conjunction with the base plate, as a heat sink for the interconnected thermopile. Fins 23a may be attached to the base plate 21a by conventional procedures such as dip brazing. The simplified heat sink configuration required for the generator represents an outgrowth of the desirable heat development control at the burner surface as previously discussed, fin size and weight being a function of burner surface temperature. As a result of temperature control, the fins may be cooled by natural convection in adverse environs having ambient temperatures as high as 125° F. The fin spacing is determined so that boundary layer interference between adjacent fins does not occur. Minimum fin spacing, $b$, is determined by the following equation:

$$b = 2.9 \left(\frac{L\,T_a}{g\Delta T}\right)^{1/4} \left(\frac{\mu_s}{\rho_s}\right)^{1/2}$$

where $L$ = average fin length
$T_a$ = ambient temperature
$g$ = constant, 32.17 ft./sec.$^2$
$\Delta T$ = temperature difference, fin root to ambient
$\mu_s$ = air viscosity at the generator surface temperature
$\rho_s$ = air density at the generator surface temperature Referring to FIGURE 5, a fuel tank assembly 70 for use with conventional gasoline fuels is illustrated in cutaway fashion. The assembly 70 comprises a fuel containment tank 76 generally of cylindrical shape and having hemispherical ends. A hemispherically-shaped reservoir 77 for retaining pressurized air is fabricated integrally with and appended to the lower portion of tank 76. The filler port, having a cap 75 is situated at the top of the tank and includes a filler neck 78 for preventing overfilling or overflow in accommodating volumetric fuel expansion. Cap 75 is of the type automatically venting as it is loosened in view of the pressurized fuel delivery system utilized. At the apex of the tank there is threadably connected primary fuel delivery valve 80 from which to the bottom of the tank extends fuel intake pipe 82. A conventional constant air pressure valve or pressure regulator 83 is threadably interconnected with air reservoir 77 through a receptacle and port 84. Upon the opposite side of the air reservoir a similar receptacle 85 contains a common air input valve. Shown in FIGURE 1 only is a hand-operated air pump 79 also connected into reservoir 77 and optionally serving the same function. From pressure regulator 83 an air line 86 extending upwardly interconnects air reservoir 77 with fuel tank 76 at a receptacle 87. An air pressure gauge as shown in FIGURES 1 and 2 at 71 may optionally be attached to the output or input side of pressure regulator 83.

In operation, air is introduced under a preselected pressure into reservoir 77. From the reservoir the air is metered at a second select pressure through regulator 83 into fuel tank 76 by way of air line 86. Under this arrangement, the fuel within tank 76 is maintained under a constant pressure without regard to its level in the tank. As a result, the burner unit receives from line 81 an unvarying fuel input, thereby enhancing control over the somewhat corresponding heat output from the burner. It may be noted that the tank 76 may be used to its entire capacity without pressure variance due to gradual fuel dimunition. The latter self-regulating characteristic advantageously permits a maximization of fuel weight allowance where a high degree of generator portability is sought. For generators having about seven inch diameter burner screens, a twelve hour fuel loading of about 5 pounds of leaded gasoline has been adequately pressurized by providing 60 p.s.i. within reservoir 77 in combination with a metering output pressure at regulator 83 of between 10 and 20 p.s.i.

The primary fuel valve 80 is conventional and of the type wherein during start-up air is bled from tank 76 to deliver a fuel-air mixture through fuel line 81. Shortly after start-up, the valve is more fully opened to thereafter deliver only fuel to the burner, preheating by then affording sufficient fuel vaporization. A comprehensive description of such valves is provided in U.S. Patent No. 2,431,665 issued Nov. 25, 1947, to B. W. Tullis.

Figure 6:
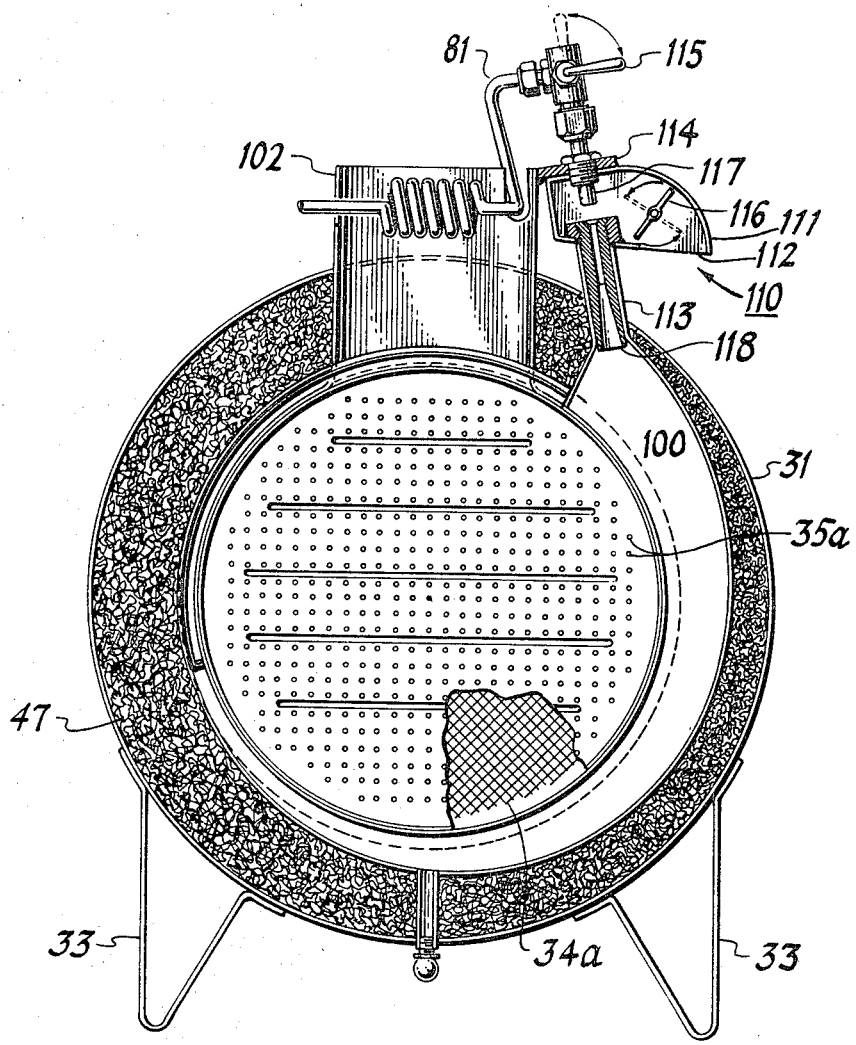
FIGURE 6 is a front elevational view of an exemplary combustion chamber of the inventive thermoelectric generator with a number of portions cut away to reveal internal structure.

The invention to now has been primarily explained in conjunction with a preferred and simply fabricated arrangement utilizing a manifold cavity of unvarying cross section in combination with a uniquely unsophisticated carburetor assembly 50. Turning to FIGURE 6, an alternate and secondly preferred manifold and carburetion assembly is illustrated wherein the cavity of manifold 100 has a progressively diminishing cross section. Cross sectional reduction progresses from carburetion assembly 110 around the burner chamber to its terminus at stack 32. As will be apparent, components of the burner assembly substantially unchanged from the embodiment earlier described retain identical identifying numerals.

The carburetion assembly 10, positioned adjacent stack 32, comprises a box-shaped carburetion chamber 111 having an open end or air intake at 112. A butterfly valve 116 is positioned within the chamber to control air intake. From the lowermost portion of chamber 111 a constricted nozzle 113 of simplified form is integrally formed with or connected to manifold 100 at its point of largest cross sectional dimension. An additional nozzle member 118 is shown positioned within nozzle 113; however, its presence has been seen to provide only marginal improvement in fuel-air flow. The chamber 111 is supported upon the burner unit by a bracket 114 attached to an elongated stack or flue 102. Leading to the upper side of chamber 111, fuel line 81 introduces pressurized fuel through an input nozzle having a constricted orifice at 117 for imparting high velocity to the incoming fuel, thereby converting pressure head to a velocity head. Connected cooperatively with nozzle 117 is a conventional clean-out pin assembly similar in operation to that described in connection with FIGURE 4. Reciprocatory motion for clearing the orifice of nozzle 117 is imparted to the clean-out pin by actuating lever 115. Where desired, the fuel line 81 may be led through the stack 102 to effect a preheating and vaporization of fuel introduced to the carburetion assembly 110.

As may be evidenced from the drawing, the manifold 100 is characterized in having a cross section which is equivalently devalued or diminished at any position about its length by the volume of fuel-air consumed or turned at that point into the burner chamber. The innovation will be found useful where an improved, less turbulent gaseous fuel flow is desired. Further, an inherent fuel pumping effect is provided by the design.

It may be noted that in both of the burner designs heretofore described, the manifolds 36 and 100 do not extend through the respective burner stacks 32 or 102. It has been found that such configurations produce undesirable "flashbacks" or pre-ignition of fuels.

Figure 7:
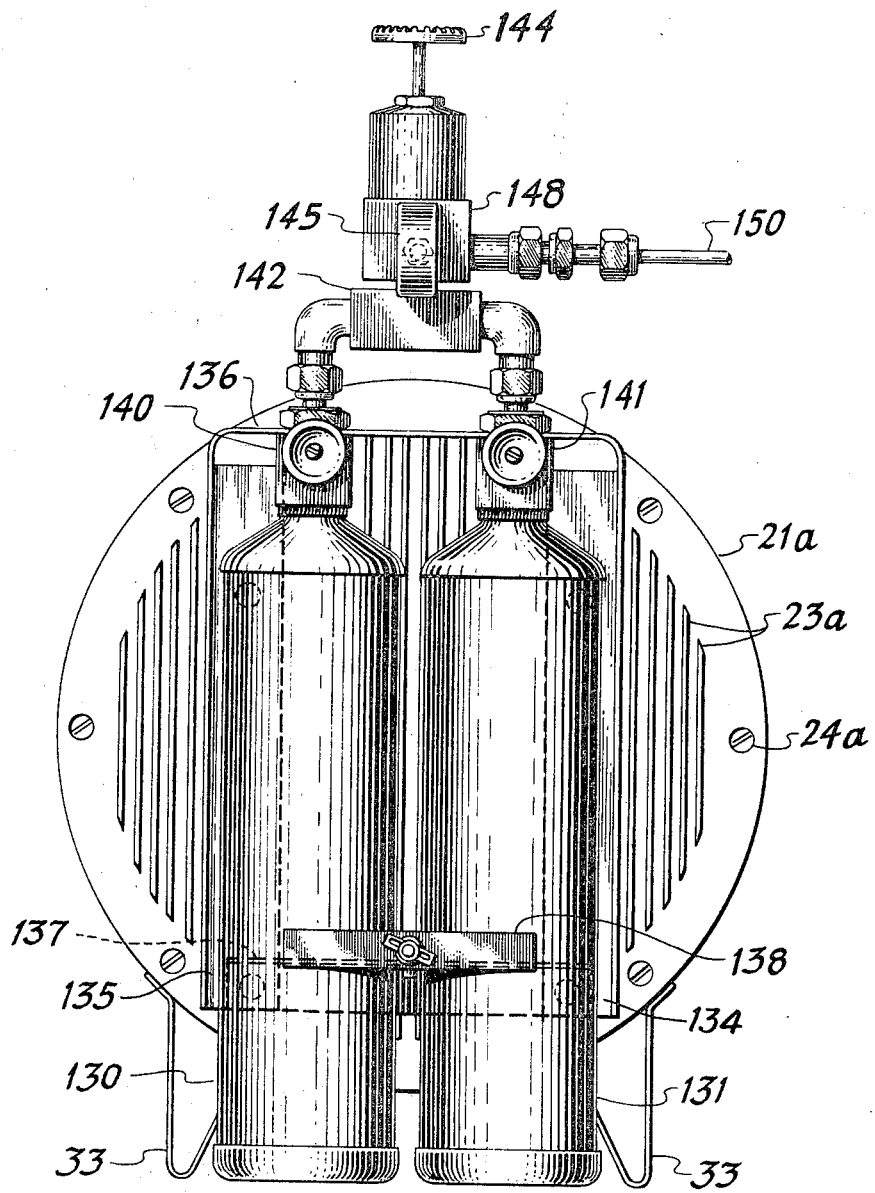
FIGURE 7 is a side elevational view of an exemplary thermoelectric generator revealing an alternate, propane tankage arrangement.

Referring to FIGURE 7, an alternate fueling arrangement for the burner-generator is pictured wherein a gas such as propane is utilized instead of a liquid fuel. In the figure, cylindrical propane tanks 130 and 131 are removably mounted upon a rectangular bracket attached to the outer surfaces of fins 23a. The bracket is formed from angle members having flanges 134 and 135 attached to bands (not shown) connected in turn to the outer edges of the fins 23c. Outwardly extending flanges 136 and 137 are formed to accommodate and retain the tanks at two sides of the bracket arrangement. A removable tie down bracket member 138, held in place by wing nut 139, retains the lower portions of the tanks against flange 137.

Propane fuel is selectively distributed from the tanks through valves 140 and 141, thence through a conventional T or union 142 prior to entry into a reducing or pressure regulating valve 148. From reducing valve 148, the gas is metered into the burner from fuel line 150. Output pressure from valve 148 is controlled by an adjusting handle 144 operated in conjunction with a conventional pressure gauge 145.

As will be apparent to those skilled in the art, no carburetion function other than simple air intake is required for burner applications utilizing propane-type fuels. Accordingly, gas arriving from line 150 is mixed with air to support combustion and introduced into either version of the previously-described manifold assemblies 36 or 100 without preheating and with only minimal adjustment of carburetor assemblies 110 or 50. The latter adjustment includes elimination of the earlier discussed cleanout pin assembly and the preheating conduit 52.

Returning to FIGURE 5, a container 90 is pictured in connection with fuel tank assembly 70. The container may be optionally included with the generator for conveniently packaging input and output circuitry along with such performance monitoring devices as are desired. In the figure, container 90 is shown including a voltmeter 93, circuit switch 95 and output jack 97. Where desired, a typical voltage regulating circuit may be incorporated within the container. The use of such a removable container is in keeping with the modular design approach to the generator.

As may be evidenced from the foregoing discussion and drawings, a burner unit for use in powering a thermopile module has been devised having a closely controlled and uniform heat input development. As a result of the uniformly controlled heat input to each thermoelement disposed within the thermopile, electrical output is maximized and thermoelement degradation caused by undisciplined heat input is minimized. A further characteristic found during operation of the device is the ability of the burner unit to operate for substantial periods of time using conventional leaded gasolines without disruption by "coking" and similar effects as are often encountered in gasoline burner units.

While there have been shown and described and pointed out the fundamental novel features of the invention as applied to preferred embodiment, it will be understood that various omissions and substitutions in the form of detail of the device shown and its method of manufacture may be made by those skilled in the art without departing from the spirit of the invention. It is the intention, therefore, to be limited only as indicated by the scope of the following claims.

We claim:
1. A burner unit for use with a thermoelectric generator comprising in combination:
 (a) spaced, perforated combustion surfaces for developing planes of substantially uniform combustion;
 (b) a hollow, annular manifold disposed in supporting relationship about the respective peripheries of said combustion surfaces, defining therewith a burner chamber and adapted to deliver a combustious mixture into said chamber for combustion at said surfaces;
 (c) means for introducing a pressurized combustible fuel and air into said manifold; and
 (d) flue means connected to said manifold for exhausting the products of combustion deriving from said combustion surfaces.

2. A burner unit for use with a thermoelectric generator comprising:
 (a) spaced, planar combustion surfaces for developing planes of substantially uniform combustion, each said surface including a perforated pressure plate, over the outward face of which is disposed a burner screen;
 (b) a hollow, annular manifold disposed in supporting relationship about the respective peripheries of said combustion surfaces, defining therewith a burner chamber and adapted to deliver a combustious mixture into said chamber for combustion at said surfaces;
 (c) means for introducing a pressurized combustible fuel and air into said manifold; and
 (d) flue means connected to said manifold for exhausting the products of combustion deriving from said combustion surfaces.

3. A burner unit for use with a thermoelectric generator comprising:
 (a) a pair of spaced, perforated planar combustion surfaces for developing planes of substantially uniform combustion;
 (b) a hollow, annular manifold having an inner annulus and disposed in supporting relationship about the respective peripheries of said combustion surfaces and connected therewith to define a burner chamber;
 (c) means disposed about the surface of said inner annulus for distributing a combustious gaseous mixture from said manifold into said burner chamber in substantially a uniform manner;
 (d) means for introducing a pressurized combustible fuel and air into said manifold; and
 (e) flue means connected to said manifold for exhausting the products of combustion deriving from said combustion surfaces.

4. A burner unit for use with a thermoelectric generator comprising:
 (a) a pair of spaced, planar combustion surfaces for developing planes of substantially uniform combustion, each said surface including a perforated pressure plate, over the outward face of which is disposed a burner screen;
 (b) a hollow, annular manifold having an inner annular and disposed in supporting relationship about the respective peripheries of said combustion surfaces and connected therewith to define a burner chamber;
 (c) means disposed about the surface of said inner annulus for distributing a combustious gaseous mixture from said manifold into said burner chamber in substantially a uniform manner;
 (d) means for introducing a pressurized combustible fuel and air into said manifold; and
 (e) flue means connected to said manifold for exhausting the products of combustion deriving from said combustion surfaces.

5. The burner unit of claim 4 in which said pressure plates extend convexly outward from said burner chamber.

6. The burner unit of claim 4 in which said hollow, annular manifold is of progressively diminishing cross section.

7. The burner unit of claim 4 in which each said pressure plate is of circular configuration and is perforated with spaced holes having a diameter of about 0.020 to 0.060 inch, and each said burner screen is spaced a preselected distance from the outward surface of each said respective pressure plates.

8. A gasoline-fueled burner unit for use with a thermoelectric generator comprising in combination:
 (a) a pair of spaced, substantially planar combustion surfaces for developing planes of combustion, each said surface including a perforated pressure plate, extending over and spaced from which is a burner screen;
 (b) a hollow, annular manifold having an inner annulus and disposed in supporting relationship about the respective peripheries of said combustion surfaces and defining therewith a burner chamber;
 (c) means disposed about said inner annulus for distributing a combustion fuel-air mixture from said manifold into said burner chamber in substantially a uniform manner;
 (d) flue means connected to form a terminus of said manifold and communicating outwardly of said burner chamber for exhausting the products of combustion deriving from said combustion surfaces;
 (e) carburetor means in communication with said manifold and adapted to mix gasoline fuel and air for introduction into the manifold; and
 (f) conduit means in association with said flue means for preheating fuel prior to its introduction into said carburetor means.

9. A thermoelectric generator comprising in combination:
 (a) a burner unit comprising:
  (1) spaced, combustion surfaces for developing at least one plane of combustion;
  (2) a hollow annular manifold disposed in supporting relationship about the respective peripheries of said combustion surfaces, defining therewith a burner chamber and adapted to deliver a combustible mixture into said chamber for combustion at at least one of said surfaces;
  (3) means for introducing a pressurized combustible fuel and air into said manifold;
  (4) flue means communicating with said combustion surfaces for exhausting the products of combustion deriving therefrom;
 (b) at least one thermopile unit having a heat dissipating side and a heat receiving face, said latter face supported juxtaposed to said burner unit and spaced therefrom in heat receiving relationship with said perforated combustion surface; and
 (c) pressurized fuel storage means for supplying combustible fuel at uniform pressure to said first-mentioned means.

10. A thermoelectric generator comprising in combination:
 (a) a burner unit comprising:
  (1) a pair of spaced planar combustion surfaces for developing planes of combustion, each of said surfaces including a perforated pressure plate, extending over and spaced from the outward face of which is a burner screen;
(2) a hollow annular manifold disposed in supporting relationship about the respective peripheries of said combustion surfaces, defining therewith a burner chamber and adapted to deliver a combustious mixture into said chamber for combustion at said surfaces;
(3) means for introducing a pressurized combustible fuel and air into said manifold;
(4) flue means communicating with said combustion surfaces for exhausting the products of combustion deriving therefrom;
(b) at least one thermopile unit having a heat dissipating side and a heat receiving face, said latter face being supported in juxtaposition to said burner unit in heat receiving relationship with one of said combustion surfaces; and
(c) pressurized fuel storage means for supplying combustible fuel at uniform pressure to said first-mentioned means.

11. The thermoelectric generator of claim 10 in which said pressurized fuel storage means comprises:
(a) a pressurizable tank for retaining a liquid fuel and having means for supplying fuel to said burner unit;
(b) a gas-tight compartment in connection with said tank and adapted to retain a gas under pressure;
(c) conduit means communicating in gas exchange relationship between said tank and said compartment; and
(d) valve means in connection with said conduit means for providing regulation of gas pressure within said conduit means.

12. The thermoelectric generator of claim 10 in which said hollow annular manifold terminates at said flue means.

13. A thermoelectric generator comprising in combination:
(a) a burner unit comprising:
(1) a pair of spaced planar combustion surfaces for developing planes of combustion, each of said surfaces including a perforated pressure plate, extending over and spaced from the outward face of which is a burner screen;
(2) an annular manifold having an inner distribution channel of progressively diminishing dimension and disposed in supporting relationship about the respective peripheries of said combustion surfaces, defining therewith a burner chamber and adapted to deliver a combustious mixture into said chamber for combustion at said surfaces;
(3) means for introducing a pressurized combustion fuel and air into said manifold;
(4) flue means communicating with said combustion surfaces for exhausting the products of combustion deriving therefrom;
(b) at least one thermopile unit having a heat dissipating side and a heat receiving face, said latter face being supported in juxtaposition to said burner unit in heat receiving relationship with one of said combustion surfaces; and
(c) pressurized fuel storage means for supplying combustible fuel at uniform pressure to said first-mentioned means.

14. A thermoelectric generator comprising in combination:
(a) a burner unit including:
(1) a pair of spaced planar combustion surfaces for developing planes of combustion, each said surface including a perforated pressure plate having a burner screen extending over and spaced from the outward face thereof;
(2) a hollow, annular manifold having an inner annulus and disposed in supporting relationship about the respective peripheries of said combustion surfaces and defining therewith a burner chamber;
(3) means disposed about said inner annulus for distributing a combustious mixture from said manifold into said burner chamber in substantially a uniform manner;
(4) flue means communicating with said combustion surfaces for exhausting the products of combustion deriving therefrom;
(5) carburetor means in communication with said manifold;
(b) at least one thermopile unit having a heat dissipating side and a heat receiving face, said latter face being supported in juxtaposition to said burner unit in heat receiving relationship wih one of said combustion surfaces; and
(c) pressurized fuel storage means for supplying combustible fuel at uniform pressure to said first-mentioned means.

15. The thermoelectric generator of claim 14 including conduit means in association with said flue means for preheating fuel prior to its introduction into said carburetor means.

16. The thermoelectric generator of claim 14 in which said pressure plates extend convexly outward from said burner chamber.

17. The thermoelectric generator of claim 14 including a convectively cooled finned radiator in connection with each said heat dissipating side serving as a heat sink for said thermopile unit.

18. A gasoline-fueled thermoelectric generator comprising in combination:
(a) a burner unit including:
(1) a pair of spaced planar combustion surfaces for developing planes of combustion, each said surface including a perforated pressure plate extending convexly outward and having a burner screen spaced from and extending over the outward face thereof;
(2) a hollow, annular manifold having an inner annulus and disposed in supporting relationship about the respective peripheries of said combustion surfaces and defining therewith a burner chamber;
(3) means disposed about said inner annulus for distributing a combustion fuel-air mixture from said manifold into said burner chamber in substantially a uniform manner;
(4) flue means connected to form a terminus of said manifold and communicating outwardly of said burner chamber for exhausting the products of combustion deriving from said combustion surfaces;
(5) carburetor means in communication with said manifold and adapted to mix vaporized gasoline fuel and air for introduction into the manifold;
(6) fuel preheating means in connection with said flue means for preheating and vaporizing gasoline prior to its introduction into said carburetor means;
(b) at least one thermopile unit having a heat dissipating side including a finned convectively cooled heat sink and a heat receiving face, said latter face being supported in juxtaposition to said burner unit in heat receiving relationship with one of said combustion surfaces;
(c) pressurized fuel storage means for supplying fuel to said burner unit through said preheating means and said carburetor means; and
(d) constant pressure means in communication with said storage means for supplying a uniform pressure within the storage means.

19. A burner unit for use with a thermoelectric generator comprising in combination:
  (a) a pair of spaced surfaces, at least one of said surfaces being perforated to form a plane for substantially uniform combustion;
  (b) a hollow, annular manifold disposed in supporting relationship about the peripheries of said spaced surfaces, defining therewith a burner chamber and adapted to deliver a combustion mixture into said chamber for combustion at said at least one perforated surface;
  (c) means for introducing a pressurized combustible fuel and air into said manifold; and
  (d) flue means connected to said manifold for exhausting the products of combustion deriving from said at least one perforated surface.

References Cited
UNITED STATES PATENTS

| | | | |
|---|---|---|---|
| 1,677,029 | 7/1928 | Fuller | 136—211 |
| 3,107,720 | 10/1963 | Swinderin | 158—99 |
| 3,122,197 | 2/1964 | Saponara et al. | 158—99 |
| 3,132,970 | 5/1964 | Lagreid | 136—205 |
| 3,326,265 | 6/1967 | Paulin | 158—99 |

ALLEN B. CURTIS, *Primary Examiner.*